(12) United States Patent
Abramson et al.

(10) Patent No.: US 7,445,410 B2
(45) Date of Patent: Nov. 4, 2008

(54) DEBURRING TOOL AND CUTTING INSERT THEREFOR

(75) Inventors: Michael Abramson, Ma'a lot (IL); Daniel Men, Haifa (IL)

(73) Assignee: Iscar Ltd. (IL)

( * ) Notice: Subject to any disclaimer, the term of this patent is extended or adjusted under 35 U.S.C. 154(b) by 0 days.

(21) Appl. No.: 11/831,148

(22) Filed: Jul. 31, 2007

(65) Prior Publication Data

US 2007/0269279 A1 Nov. 22, 2007

Related U.S. Application Data

(63) Continuation of application No. PCT/IL2006/000232, filed on Feb. 22, 2006.

(30) Foreign Application Priority Data

Mar. 1, 2005 (IL) .................................... 167179

(51) Int. Cl.
*B23D 77/02* (2006.01)

(52) U.S. Cl. .................... 408/154; 408/93; 408/181; 407/103; 407/113

(58) Field of Classification Search ............... 408/93, 408/94, 153–155, 181, 211, 224, 713; 407/103, 407/104, 113
See application file for complete search history.

(56) References Cited

U.S. PATENT DOCUMENTS

| | | | | |
|---|---|---|---|---|
| 2,703,996 A | * | 3/1955 | Reynolds et al. ............ | 408/143 |
| 2,777,342 A | * | 1/1957 | Fried ........................... | 408/153 |
| 2,804,789 A | * | 9/1957 | Randles et al. .............. | 408/143 |
| 2,829,543 A | * | 4/1958 | Bergstrom ................... | 408/224 |
| 3,345,888 A | * | 10/1967 | Gustkey ...................... | 82/1.3 |
| 3,672,784 A | * | 6/1972 | McCreery .................... | 408/178 |
| 3,973,309 A | * | 8/1976 | Kummer ...................... | 407/104 |
| 3,973,861 A | * | 8/1976 | Sussmuth .................... | 408/154 |
| 3,996,651 A | * | 12/1976 | Heaton et al. ............... | 407/104 |
| 4,030,176 A | * | 6/1977 | Michonski ................... | 407/107 |
| 4,140,432 A | * | 2/1979 | Heule .......................... | 408/154 |
| 4,398,853 A | * | 8/1983 | Erickson ..................... | 407/104 |
| 4,880,339 A | * | 11/1989 | Doge .......................... | 408/161 |
| 5,181,810 A | * | 1/1993 | Heule .......................... | 408/147 |
| 5,396,693 A | * | 3/1995 | Lohner ....................... | 29/527.1 |
| 5,417,525 A | * | 5/1995 | Lenhart ....................... | 408/24 |

(Continued)

FOREIGN PATENT DOCUMENTS

DE 212 669 8/1984

(Continued)

OTHER PUBLICATIONS

International Preliminary Report on Patentability and Written Opinion of the International Searching Authority, PCT/IL2006/000232, Sep. 11, 2007.

(Continued)

*Primary Examiner*—David P Bryant
*Assistant Examiner*—Eric A Gates
(74) *Attorney, Agent, or Firm*—Womble Carlyle (57) ABSTRACT

A deburring tool has a cutting insert slidably supported therein. The deburring cutting insert has a cylindrical major body and is moveable between a retracted position and an extended position by means of a biasing spring located alongside the cutting insert.

20 Claims, 5 Drawing Sheets

U.S. PATENT DOCUMENTS

| | | | | |
|---|---|---|---|---|
| 5,755,538 A * | 5/1998 | Heule | | 408/154 |
| 5,803,679 A * | 9/1998 | Heule | | 408/211 |
| 5,865,573 A | 2/1999 | Kress et al. | | |
| 6,158,928 A * | 12/2000 | Hecht | | 407/102 |
| 6,254,319 B1 * | 7/2001 | Maier et al. | | 408/57 |
| 7,217,070 B2 * | 5/2007 | Hecht | | 408/154 |
| 7,261,495 B1 * | 8/2007 | Nelson et al. | | 407/105 |
| 7,261,498 B2 * | 8/2007 | Hecht et al. | | 408/154 |
| 2004/0005200 A1 | 1/2004 | Heule et al. | | |

FOREIGN PATENT DOCUMENTS

| | | |
|---|---|---|
| DE | 212669 A1 | 8/1984 |
| EP | 1 075 888 | 2/2001 |
| EP | 1075888 A | 2/2001 |

OTHER PUBLICATIONS

International Search Report, PCT IL2006/000232, dated Jan. 8, 2006 and Written Opinion of the International Search Authority.

* cited by examiner

DEBURRING TOOL AND CUTTING INSERT THEREFOR

RELATED APPLICATIONS

This is Continuation of International Application PCT/IL2006/0001232, filed Feb. 22, 2006, and published in English as WO 2006/092780. The contents of the aforementioned international application are incorporated by reference in their entirety.

FIELD OF THE INVENTION

The present invention relates to a tool comprising a spring-loaded deburring cutting insert for the deburring of bores.

BACKGROUND OF THE INVENTION

An example of such a deburring tool is disclosed in U.S. Pat. No. 5,755,538. The deburring tool has a tool holder having a radial window extending radially therein and ending at a rear wall and a cutting insert having a rear groove. The cutting insert is spring-loaded by a spring that is attached to the rear wall and is located in and engages the rear groove. It is noted that in the deburring tool, the presence of the rear groove may weaken the insert. Moreover there is no adjusting mechanism for adjusting the biasing force that the spring applies to the cutting insert.

It is an object of the present invention to provide an improved deburring tool and a further object is to provide an improved cutting insert for deburring.

SUMMARY OF THE INVENTION

In accordance with the present invention there is preferably provided a deburring cutting insert comprising:
a generally cylindrical major body,
a cutting portion at a forward end of the major body,
a spring recess formed in a peripheral surface of the major body and opening out at the rear end of the major body, and
a holding recess formed in the peripheral surface of the major body.

The major body has a first diameter and a first length and the ratio of the first length to the first diameter may be in the range of 1 to 2.

In accordance with some embodiments, the cutting insert further comprises a minor body extending rearwardly from a rear end of the major body.

If desired, the minor body is generally cylindrical.

In accordance with a preferred embodiment, the spring recess is located circumferentially opposite the holding recess.

In accordance with the present invention there is also preferably provided a generally cylindrical tool holder having a tool diameter and an insert pocket adjacent a front end thereof, the insert pocket comprising:
a generally cylindrical major cavity having a longitudinal cavity axis, the major cavity opening out to a peripheral tool surface of the tool holder via a major aperture,
a spring bore communicating with the major cavity and opening out to the peripheral tool surface of the tool holder, and
a holding bore communicating with the major cavity and opening out to the front end of the tool holder.

In accordance with some embodiments, the insert body further comprises a minor cavity which communicates with the major cavity and opens out to the peripheral tool surface of the tool holder via a minor aperture.

If desired, the minor cavity is generally cylindrical.

In accordance with a preferred embodiment, the minor cavity is collinear with the major cavity.

In accordance with the present invention there is also preferably provided a deburring tool comprising:
a generally cylindrical tool holder having a tool diameter and an insert pocket adjacent a front end thereof, the insert pocket comprising:
a generally cylindrical major cavity having a longitudinal cavity axis, the major cavity opening out to a peripheral tool surface of the tool holder via a major aperture,
a spring bore communicating with the major cavity and opening out to the peripheral tool surface of the tool holder, and
a holding bore communicating with the major cavity and opening out to the front end of the tool holder;
a deburring cutting insert comprising:
a generally cylindrical major body,
a cutting portion at a forward end of the major body,
a spring recess formed in a peripheral surface of the major body and opening out at the rear end of the major body, and
a holding recess formed in the peripheral surface of the major body; wherein the major body portion is located in the generally cylindrical major cavity, the cutting insert being laterally slidable between a retracted position and an extended position by means of a spring which biases the cutting insert towards the extended position, wherein in the extended position at least a portion of the cutting portion protrudes from the major aperture beyond the peripheral tool surface of the tool holder; and
a holding member having a shaft, the holding member being located in a holding bore formed in a front surface at the front end of the tool holder, the holding bore being in communication with the major cavity, wherein the shaft protrudes into the major cavity and into the holding recess for limiting the lateral slidable movement of the cutting insert.

BRIEF DESCRIPTION OF THE FIGURES

For a better understanding of the present invention and to show how the same may be carried out in practice, reference will now be made to the accompanying drawings, in which.

DETAILED DESCRIPTION OF THE INVENTION

Figure 1:
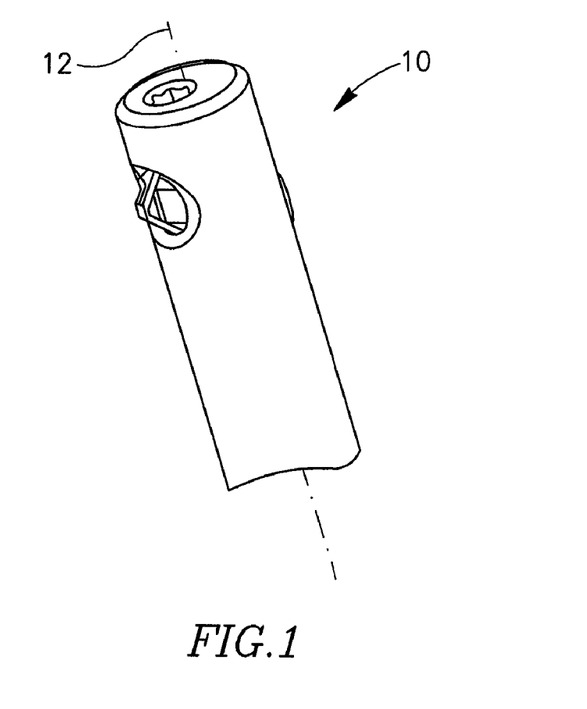
FIG. 1 is a perspective view of a deburring tool in accordance with the present invention.
Figure 2:
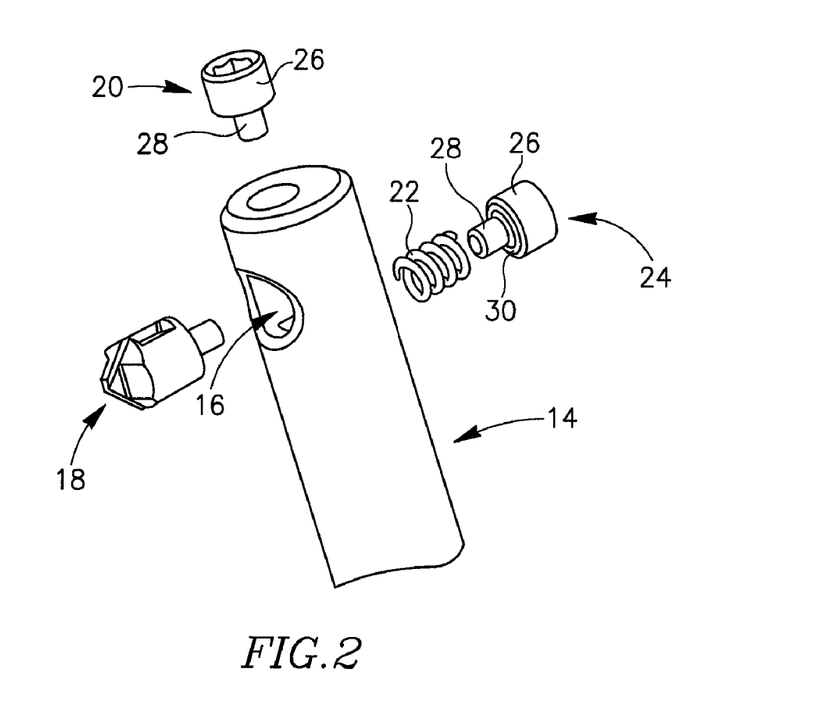
FIG. 2 is an exploded perspective view of the deburring tool shown in FIG. 1.
Figure 3:
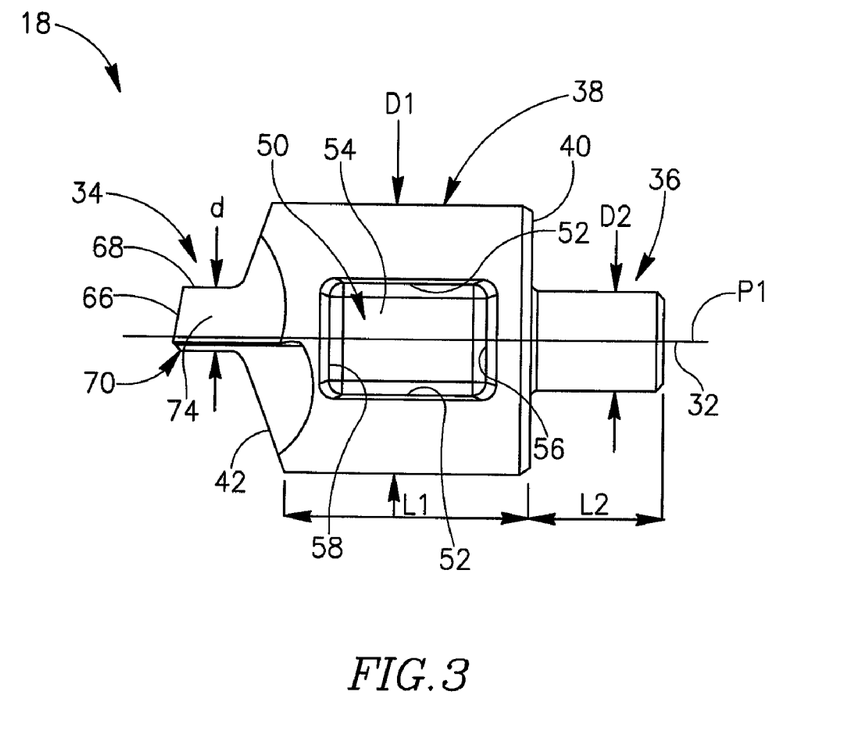
FIG. 3 is a first side view of a deburring cutting insert in accordance with the present invention.
Figure 4:
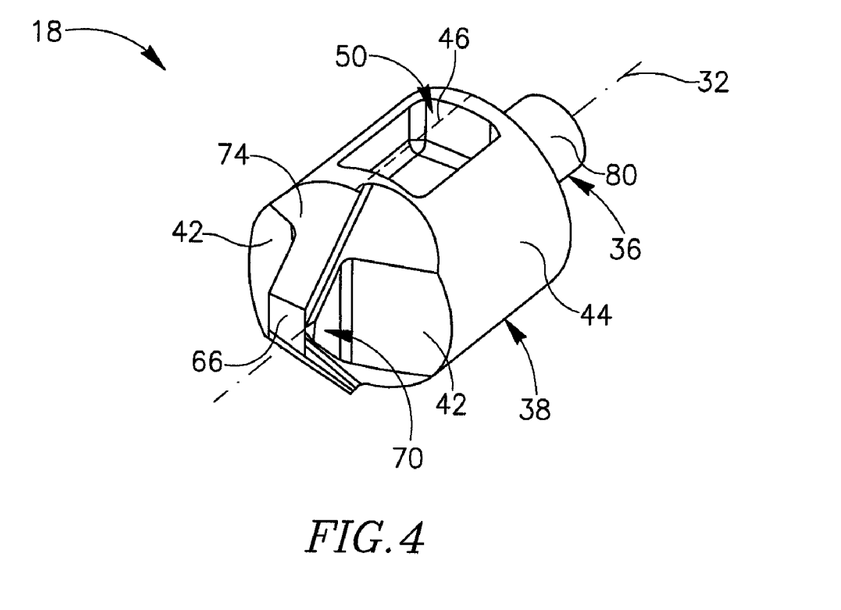
FIG. 4 is a forward perspective view of the cutting insert shown in FIG. 3.
Figure 5:
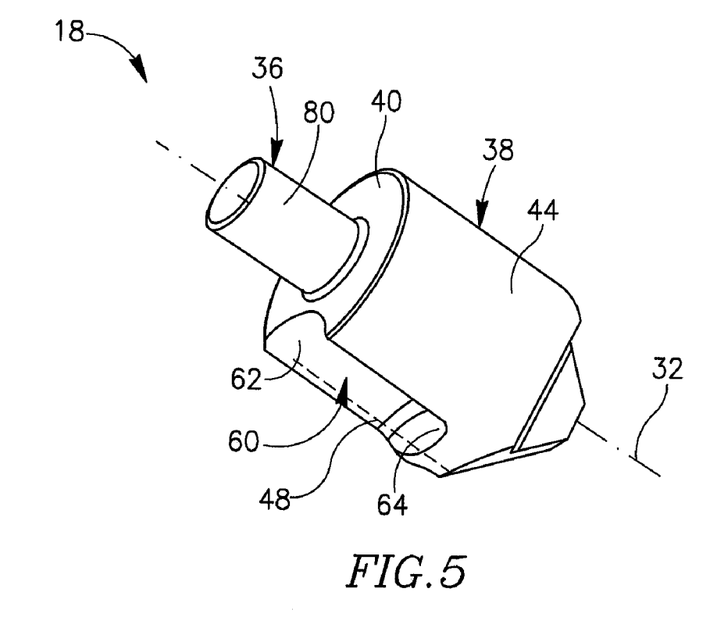
FIG. 5 is a rear perspective view of the cutting insert shown in FIG. 3.
Figure 6:
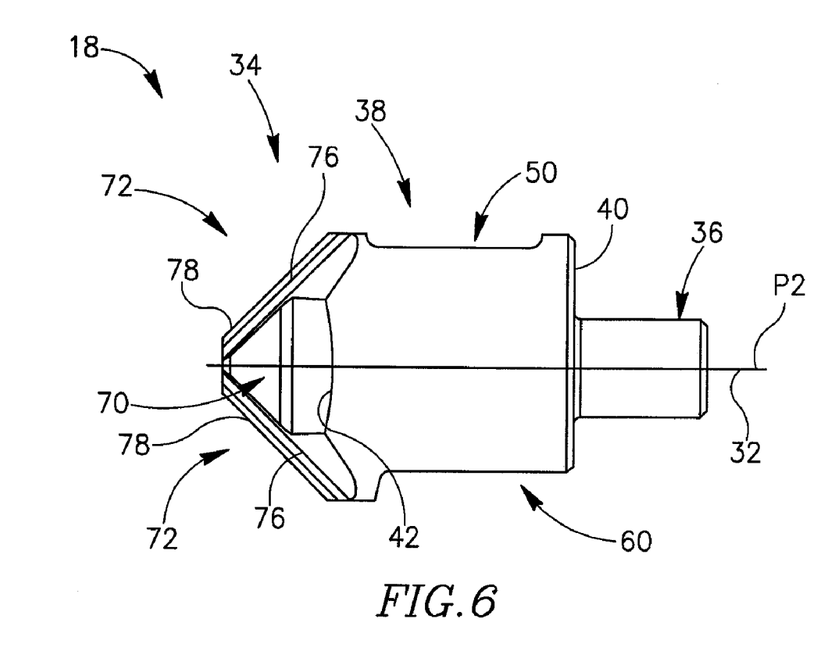
FIG. 6 is a second side view of the cutting insert shown in FIG. 3.

Attention is first drawn to FIGS. 1 and 2 showing a deburring tool 10 in accordance with the present invention. The deburring tool 10 has a longitudinal axis of rotation 12, defining a front to back direction, and comprises a cylindrical tool holder 14. The tool holder 14 has an insert pocket 16 at a front end thereof in which a deburring cutting insert 18 is slidably retained, being capable of lateral movement between a retracted position and an extended position. As will be described in greater detail below, the cutting insert 18 is prevented from exiting the insert pocket 16 by means of a holding member 20, and is spring-loaded in the insert pocket 16 by means of a spring 22 which engages the cutting insert 18 at one of its ends and a loading member 24 at the other end. The spring 22 is a helical compression spring having a helical coil. The loading member 24 and the holding member 20 are similar in form, both having a cylindrical threaded head 26 and a cylindrical shaft 28 of smaller diameter than the threaded head 26 so that a radially extending annular surface 30 is formed between the shaft 28 and threaded head 26. It should be noted that directional terms appearing throughout the specification and claims, e.g. "front", "back", "forward", "rear", etc., are used as terms of convenience to distinguish various surfaces relative to each other. Although these terms may be meaningful with reference to particular component orientations, they are used for illustrative purposes only, and are not intended to limit the scope of the appended claims.

Attention in now drawn to FIGS. 3 to 6. The cutting insert 18 has a longitudinal insert axis 32 defining a forward to rear direction, a cutting portion 34 and a major body 38. The major body 38 has a generally cylindrical shape having a first diameter D1 and a first length L1. In accordance with some embodiments, the ratio of the first length to the first diameter, L1/D1 is in the range of 1 to 2. In accordance with a specific example, the ratio of the first length to the first diameter, L1/D1 is equal to 1.43. The major body 38 has a rear surface 40 at a rear end, a forward surface 42 at a forward end and a peripheral surface 44 extending therebetween. The cutting insert 18 may have a minor body 36 extending rearwardly from the rear end of the major body 38. The minor body 36 may extend along the insert axis 32 and may be generally cylindrical in shape. A first plane P1, which includes the insert axis 32, intersects opposing sides of the major body's peripheral surface 44 along first and second intersecting lines. A first imaginary line 46, which includes the first intersecting line, extends between the rear and forward surfaces 40, 42. A second imaginary line 48, which includes the second intersecting line, also extends between the rear and forward surfaces 40, 42.

A holding recess 50 is formed in the peripheral surface 44 of the major body 38 along a portion of the first imaginary line 46. The holding recess 50 has two side walls 52 extending longitudinally on opposing sides of the first plane P1. Each side wall 52 has a forward and a rear end and extends from the peripheral surface 44 to a recess base 54. A rear wall 56 of the recess 50 extends from the peripheral surface 44 to the recess base 54 and bridges between the rear ends of the side walls 52. A forward wall 58 of the recess 50 extends from the peripheral surface 44 to the recess base 54 and bridges between the forward ends of the side walls 52.

A spring recess 60, having a recess face 62 and a support face 64, is formed in the peripheral surface 44 of the major body 38 along a portion of the second imaginary line 48 and opens out to the rear surface 40. The holding recess 50 is located circumferentially opposite the spring recess 60. The recess face 62 has a concave arc shape in a cross section perpendicular to the second imaginary line 48. The support face 64 is located at a forward end of the spring recess 60, is perpendicular to the second imaginary line 48 and extends from the peripheral surface 44 to the recess face 62.

The cutting portion 34 protrudes forwardly from the forward surface 42 of the cutting insert 18 to an insert nose 66 and has opposing first and second side surfaces 68, 70. The first and second side surfaces 68, 70 are located on opposite sides of the first plane P1 and are generally parallel thereto. A width d which is measured between the first and second side surfaces 68, 70 is smaller than the first diameter D1. A second plane P2 which includes the insert axis 32 is perpendicular to the first plane P1. The cutting portion 34 has two cutting segments 72 which are reflection symmetric with respect to the second plane P2. Each cutting segment 72 comprises a relief surface 74, a rake surface 76 and a cutting edge 78 therebetween. The rake surface 76 is associated with the second side surface 70. The relief surface 74 slants towards the second plane P2 from the major body's peripheral surface 44 to the insert nose 66. The minor body 36 may extend a second length L2 along the insert axis 32 and may have a peripheral surface 80 having a second diameter D2 which is smaller than the first diameter D1.

Figure 7:
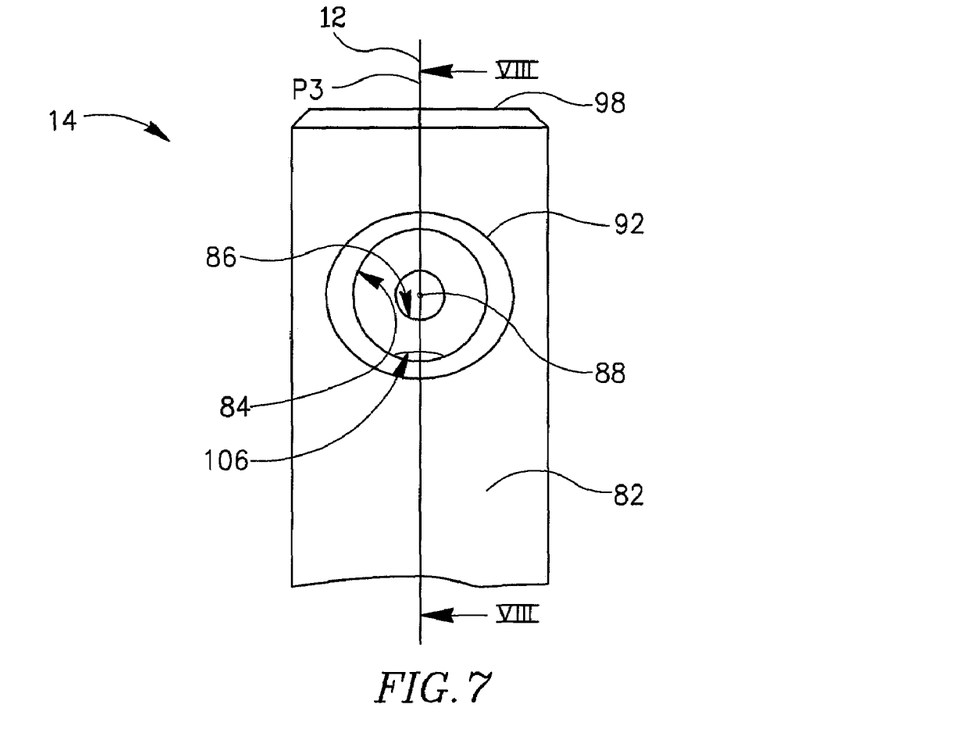
FIG. 7 is a partial side view of a tool holder of the deburring tool.
Figure 8:
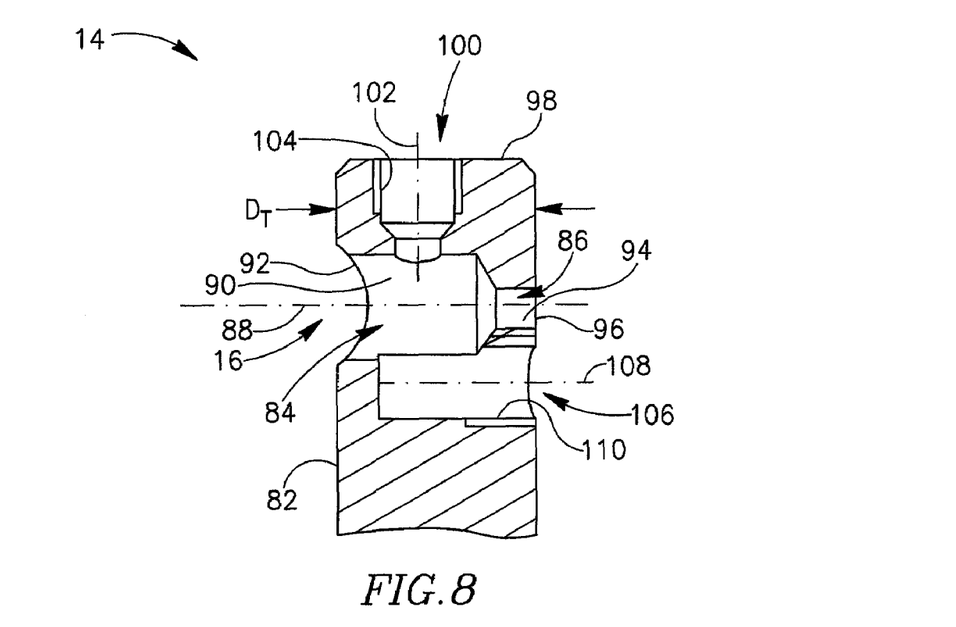
FIG. 8 is a cross sectional view of the tool holder taken along the line VIII-VIII in FIG. 7.

Attention is now drawn to FIGS. 7 and 8. The tool holder 14 extends along the longitudinal axis of rotation 12 and has a tool diameter $D_T$ and a peripheral tool surface 82. The insert pocket 16 has a cylindrical major cavity having a cavity axis 88. The major cavity 84 has a major cavity face 90 and opens out to the peripheral tool surface 82 via a major aperture 92. The insert pocket 16 may have a minor cavity 86. The minor cavity 86 may be generally cylindrical in shape and may be concentric with and extend along the cavity axis 88. The major and minor cavities 84, 86 do not overlap. The minor cavity 86 has a minor cavity face 94 and opens out to the peripheral tool surface 82 via a minor aperture 96. The minor aperture 96 may be diametrically opposite the major aperture 92. A third plane P3, which includes the cavity axis 88 and the axis of rotation 12, passes through the tool holder 14. The tool holder 14 has a front surface 98 at its front end. A holding bore 100 is formed in the front surface 98 and communicates with the major cavity 84. The holding bore 100 extends along a holding axis 102 that lies in the third plane P3 and is perpendicular to the cavity axis 88. A threaded portion 104 of the holding bore 100 is located adjacent the front surface 98 of the tool holder 14. A spring bore 106 having a spring axis 108 communicates with the major cavity 84 and opens out to the peripheral tool surface 82 adjacent the minor aperture 96. The spring axis 108 lies in the third plane P3 and is located backwardly of the cavity axis 88 and parallel to the cavity axis 88. A threaded segment 110 of the spring bore 106 is located adjacent the peripheral tool surface 82.

Figure 9:
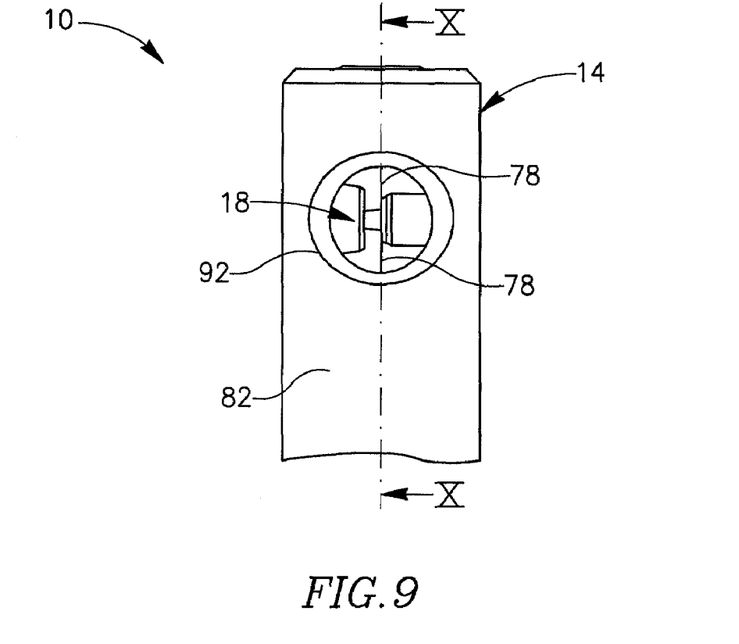
FIG. 9 is a partial side view of the deburring tool.
Figure 10:
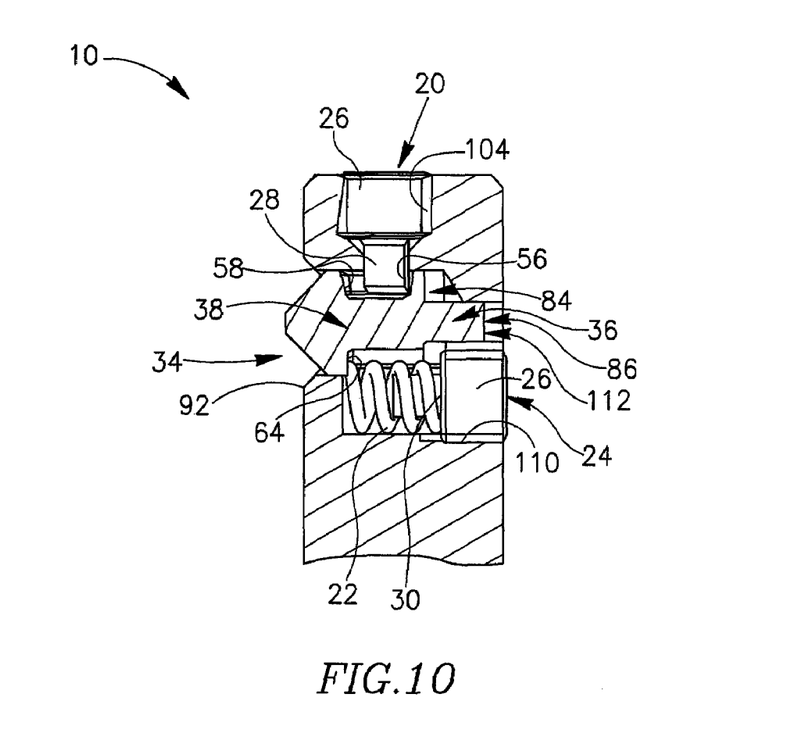
FIG. 10 is a cross sectional view of the deburring tool taken along the line X-X in FIG. 9.

Attention is now drawn to FIGS. 9 and 10. The cutting insert 18 is located in the insert pocket 16 with the peripheral surface 80 of the minor body 36 at least partially abutting the minor cavity face 94, the peripheral surface 44 of the major body 38 abutting the major cavity face 90, and the recess base 54 of the holding recess 50 facing the front end of the tool holder 14. The holding member 20 is located in the holding bore 100 with its head 26 threadingly engaging the threaded portion 104 of the holding bore 100. The shaft 28 of the holding member 20 protrudes into the major cavity 84 of the tool holder 14 and into the holding recess 50 of the cutting insert 18. The spring 22 and the loading member 24 are located in the spring bore 106 with the loading member 24 trapping the spring 22 therein. Therefore, the loading member 24 acts as a plug to prevent the spring 22 from exiting the spring bore 106. The head 26 of the loading member 24 threadingly engages the threaded segment 110 of the spring bore 106 and the shaft 28 of the loading member 24 projects into the helical coil of the spring 22.

Loading of the cutting insert 18 in the deburring tool 10 is provided by the spring 22 being compressed between the support face 64 of the cutting insert 18 and the annular surface 30 of the loading member 24. As a result, the spring 22 is biased and applies a predetermined force to the cutting insert 18 urging it radially outwardly. The force applied by the spring 22 can be adjusted by adjusting the location of the loading member 24. This is done by "screwing" the loading member 24 either inwards or outwards.

The lateral slidable movement of the cutting insert 18 between the retracted and the extended position is limited by the shaft 28 of the holding member 20 abutting the forward and rear walls 58, 56 of the holding recess 50, respectively. In the extended position (FIG. 10) the cutting portion 34 of the cutting insert 18 protrudes from the major aperture 92 beyond the peripheral tool surface 82. Rotation of the cutting insert 18 in a given direction around the cavity axis 88 is limited in the deburring tool 10 by the shaft 28 of the holding member 20 abutting against a respective side wall 52 of the holding recess 50.

Generally speaking, a first object being slidably supported along an axis within a second object is less likely to get wedged therein the smaller its width perpendicular to the axis is and the larger its length along the axis is. In the deburring tool 10, the peripheral surfaces 44, 80 of the major and minor bodies 38, 36 of the cutting insert 18 are the surfaces which are slidably supported by the insert pocket 16 when the cutting insert 18 slides therein. The presence of the minor body's peripheral surface 80, with its smaller diameter D2 and the full lateral extent (i.e., perpendicular to the axis of rotation 12) of the deburring tool 10 being available for slidable support, are parameters which increase the stability of the cutting insert 18 against wedging.

As can be seen in FIG. 10, the fact that the spring 22 is located alongside the cutting insert 18 and does not extend rearwardly beyond a rear end 112 of the cutting insert 18 is advantageous, since the lateral extent of the combination of the cutting insert 18 and spring 22 is merely the lateral extent of the cutting insert 18, which is much less than in prior art tools in which the spring extends rearwardly beyond the rear end of the cutting insert. Therefore, the tool diameter $D_T$ of the deburring tool 10 of the present invention can be made smaller than that of prior art deburring tools in which a spring extends rearwardly beyond the rear end of the cutting insert, allowing it to deburr smaller diameter bores. Moreover, the biasing force of the spring 22 is adjustable, as described hereinabove.

It will be appreciated from FIGS. 1, 2, 9 and 10 that the "deburring mechanism", of the deburring tool 10 of the present invention, that is, the cutting insert 18, spring 22, loading member 24 and holding member 20 described hereinabove, is localized in a small region of the tool holder 14. It will be clear to the skilled person that the holding bore 100 is not restricted to pass through the front surface 98 of the tool holder 14 and therefore it is a simple matter of design to locate the "deburring mechanism" in any required tool holder by forming the insert pocket 16 and the holding and spring bores 100, 106, in much the manner as in the deburring tool 10 described herein above.

Although the present invention has been described to a certain degree of particularity, it should be understood that various alterations and modifications could be made without departing from the scope of the invention as hereinafter claimed.

What is claimed is:

1. A deburring cutting insert comprising:
   a generally cylindrical major body,
   a minor body extending rearwardly from a rear end of the major body,
   a cutting portion at a forward end of the major body,
   a spring recess formed in a peripheral surface of the major body and opening out at the rear end of the major body, and
   a holding recess formed in the peripheral surface of the major body, wherein
   the major body, the minor body, the cutting portion, the spring recess and the holding recess together have unitary construction.

2. The deburring cutting insert according to claim 1, wherein the major body has a first diameter and a first length and wherein the ratio of the first length to the first diameter is in the range of 1 to 2.

3. The deburring cutting insert according to claim 1, wherein the minor body is generally cylindrical.

4. The deburring cutting insert according to claim 1, wherein:
   the spring recess is formed in a generally cylindrical outer peripheral surface of the major body and is located circumferentially opposite the holding recess.

5. A deburring cutting insert comprising:
   a generally cylindrical major body,
   a cutting portion at a forward end of the major body,
   a spring recess formed in a peripheral surface of the major body and opening out at the rear end of the major body, and
   a holding recess formed in the peripheral surface of the major body, wherein:
   the major body, the cutting portion, the spring recess and the holding recess together have unitary construction; and wherein
   the spring recess is formed in a generally cylindrical outer peripheral surface of the major body and is located circumferentially opposite the holding recess.

6. A generally cylindrical tool holder having a longitudinal axis of rotation defining a front to back direction, a tool diameter and an insert pocket adjacent a front end of the tool holder, the insert pocket comprising:
   a generally cylindrical major cavity having a longitudinal cavity axis, the major cavity opening out to a peripheral tool surface of the tool holder via a major aperture,
   a spring bore communicating with the major cavity and opening out to the peripheral tool surface of the tool holder, wherein the spring bore has a spring axis which is located backwardly along the longitudinal axis of rotation, relative to the longitudinal cavity axis, and
   a holding bore communicating with the major cavity, the holding bore opening out to the front end of the tool holder along a holding axis that is transverse to said longitudinal cavity axis.

7. The tool holder according to claim 6, further comprising a minor cavity communicating with the major cavity and opening out to the peripheral tool surface of the tool holder via a minor aperture.

8. The tool holder according to claim 7, wherein the minor cavity is generally cylindrical.

9. The tool holder according to claim 8, wherein the minor cavity is collinear with the major cavity.

10. A deburring tool comprising:
    a generally cylindrical tool holder having a tool diameter and an insert pocket adjacent a front end thereof; wherein the insert pocket comprises:

a generally cylindrical major cavity having a longitudinal cavity axis, the major cavity opening out to a peripheral tool surface of the tool holder via a major aperture, a spring bore communicating with the major cavity and opening out to the peripheral tool surface of the tool holder, and a holding bore communicating with the major cavity and opening out to the front end of the tool holder; and a deburring cutting insert retained in the insert pocket, the deburring cutting insert comprising:

a generally cylindrical major body, a cutting portion at a forward end of the major body, a spring recess formed in a peripheral surface of the major body and opening out at the rear end of the major body, and a holding recess formed in the peripheral surface of the major body, wherein the major body, the cutting portion, the spring recess and the holding recess together have unitary construction.

11. The deburring tool according to claim 10, wherein:

the deburring cutting insert's major body portion is located in the generally cylindrical major cavity; and the deburring cutting insert is laterally slidable between a retracted position and an extended position by means of a spring which biases the deburring cutting insert towards the extended position, wherein in the extended position at least a portion of the cutting portion protrudes from the major aperture beyond the peripheral tool surface of the tool holder.

12. The deburring tool according to claim 11, further comprising:

a holding member having a shaft, wherein:

the holding member is located in a holding bore formed in a front surface at the front end of the tool holder;

the holding bore is in communication with the major cavity; and the shaft protrudes into the major cavity and into the holding recess, and limits the lateral slidable movement of the deburring cutting insert.

13. The deburring tool according to claim 10, wherein in the deburring cutting insert, the major body has a first diameter and a first length; and a ratio of the first length to the first diameter is in the range of 1 to 2.

14. The deburring tool according to claim 10, wherein:

in the deburring cutting insert, the spring recess is formed in a generally cylindrical outer peripheral surface of the major body and is located circumferentially opposite the holding recess.

15. The deburring tool according to claim 10, wherein:

the toolholder has a longitudinal axis of rotation defining a front to back direction; and the spring bore has a spring axis which is located backwardly along the longitudinal axis of rotation, relative to the longitudinal cavity axis.

16. A deburring tool comprising:

a generally cylindrical tool holder having a tool diameter and an insert pocket adjacent a front end thereof; and a deburring cutting insert retained in the insert pocket, the deburring cutting insert comprising:

a generally cylindrical major body, a cutting portion at a forward end of the major body, a spring recess formed in a peripheral surface of the major body and opening out at the rear end of the major body, and a holding recess formed in the peripheral surface of the major body, wherein the major body, the cutting portion, the spring recess and the holding recess together have unitary construction, and wherein the spring recess is formed in a generally cylindrical outer peripheral surface of the major body and is located circumferentially opposite the holding recess.

17. A deburring tool comprising:

a generally cylindrical tool holder having a tool diameter and an insert pocket adjacent a front end thereof; and a deburring cutting insert retained in the insert pocket, the deburring cutting insert comprising:

a generally cylindrical major body, a minor body extending rearwardly from a rear end of the major body, a cutting portion at a forward end of the major body, a spring recess formed in a peripheral surface of the major body and opening out at the rear end of the major body, and a holding recess formed in the peripheral surface of the major body, wherein the major body, the minor body, the cutting portion, the spring recess and the holding recess together have unitary construction.

18. The deburring tool according to claim 17, wherein the insert pocket comprises:

a generally cylindrical major cavity having a longitudinal cavity axis, the major cavity opening out to a peripheral tool surface of the tool holder via a major aperture, a spring bore communicating with the major cavity and opening out to the peripheral tool surface of the tool holder, and a holding bore communicating with the major cavity and opening out to the front end of the tool holder.

19. The deburring tool according to claim 17, wherein:

the minor body is generally cylindrical.

20. The deburring tool according to claim 17, wherein:

in the deburring cuTTing insert, the spring recess is formed in a generally cylindrical outer peripheral surface of the major body and is located circumferentially opposite the holding recess.

* * * * *